United States Patent
Goto

[11] Patent Number: 5,289,226
[45] Date of Patent: Feb. 22, 1994

[54] FOCUS DETECTING DEVICE INCLUDING A DIFFUSION SURFACE DISPOSED ON A PREDETERMINED IMAGE SURFACE

[75] Inventor: Hisashi Goto, Musashino, Japan

[73] Assignee: Olympus Optical Co., Ltd., Tokyo, Japan

[21] Appl. No.: 883,579

[22] Filed: May 15, 1992

[30] Foreign Application Priority Data

May 15, 1991 [JP] Japan .................... 3-110307

[51] Int. Cl.$^5$ .............................. G03B 13/36
[52] U.S. Cl. ................................ 354/402
[58] Field of Search ............ 354/402, 406, 407, 408

[56] References Cited

U.S. PATENT DOCUMENTS

| | | | |
|---|---|---|---|
| 3,827,064 | 7/1974 | Kiyohara et al. | 354/402 |
| 4,155,004 | 5/1979 | Schulz | 354/402 X |
| 4,826,301 | 5/1989 | Ikemori | 354/408 X |
| 4,990,947 | 2/1991 | Komiya et al. | 354/402 |
| 5,070,353 | 12/1991 | Komiya et al. | 354/402 |

FOREIGN PATENT DOCUMENTS

| | | |
|---|---|---|
| 55-118019 | 9/1980 | Japan . |
| 58-106511 | 6/1983 | Japan . |
| 60-32012 | 2/1985 | Japan . |
| 63-127217 | 5/1988 | Japan . |
| 63-131111 | 6/1988 | Japan . |
| 2-275916 | 11/1990 | Japan . |
| 3-296010 | 12/1991 | Japan . |

*Primary Examiner*—W. B. Perkey
*Attorney, Agent, or Firm*—Cushman, Darby & Cushman

[57] ABSTRACT

A focus detecting device comprising a photographic lens system, photoelectric converting elements for converting light intensity distribution of a light bundle having passed through the photographic lens system into electric signals, and an optical element having diffusion surface disposed on a predetermined image surface located in an optical path between the photographic lens system and the photoelectric converting elements or in the vicinity of the predetermined image surface. This focus detecting device is capable of accurately detecting focused points freely from influences due to F-numbers and locations of exit pupils of the photographic lens systems, and can be composed so as to have a compact and simple composition.

2 Claims, 7 Drawing Sheets

FOCUS DETECTING DEVICE INCLUDING A DIFFUSION SURFACE DISPOSED ON A PREDETERMINED IMAGE SURFACE

BACKGROUND OF THE INVENTION

1) Field of the Invention

The present invention relates to a focus detecting device which is to be used with photographing apparatus such as cameras.

2) Description of the Prior Art

There have conventionally been proposed various types of focus detecting devices which detect amounts of deviations of images of objects to be photographed with optical instruments such as cameras from their properly focused points and bring the optical instruments into properly focused conditions. Of the devices described above, the focus detecting devices, which detect focused points by utilizing light bundles having passed through photographic optical systems or portions thereof, are widely adopted for the ordinary reflex cameras, etc. owing to merits that these devices do not produce parallax dependent on photographing distances, and that these devices can correct deviations of the focused points caused due to manufacturing errors as well as moving errors of photographic lenses and other members.

The focus detecting devices, which detect focused points by utilizing light bundles having passed through the photographic optical systems or portions thereof, are typically represented by the following two types. One is a so-called phase correlation type, which uses a pair of lenses for reimaging two light bundles having passed through two different portions of a photographic lens having exit pupils at different locations and detecting a focused point by utilizing a fact that an amount of defocus is varied in conjunction with a distance between the two images thus obtained. The other type is a so-called contrast type, which detects contrast on an image formed by a light bundle having passed through a photographic optical system and detects a focused point by searching for a location at which the contrast is the highest.

Figure 1:
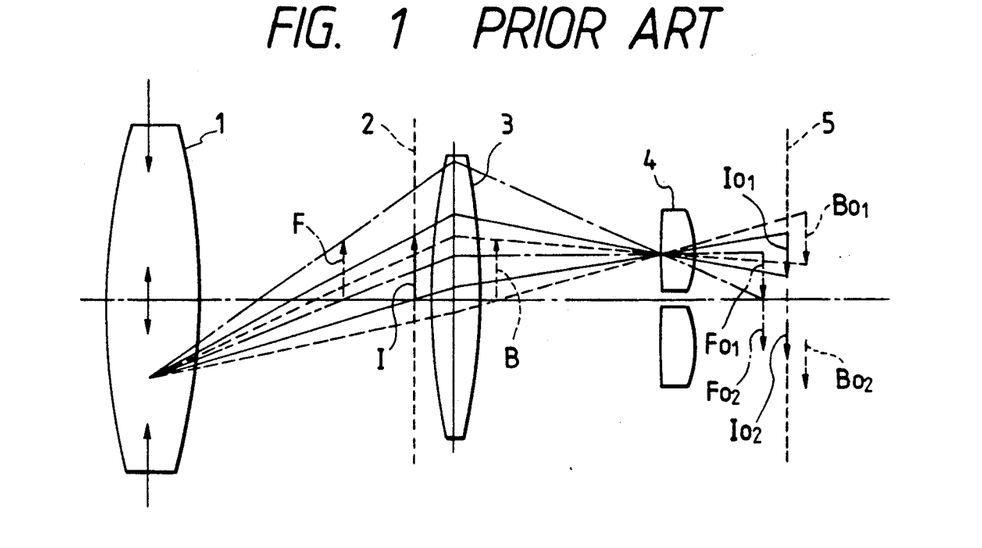
FIG. 1 is a sectional view illustrating the focus detecting optical system of the conventional phase difference type.

Out of the two types described above, the phase correlation type, or phase difference type, will be described first with reference to FIG. 1. The focus detecting device illustrated in FIG. 1 consists of a photographic lens 1, a condenser lens 3 which is disposed in the vicinity of an image surface on which an image of an object to be photographed is to be formed by the photographic lens 1 (i.e., a predetermined focal plane or a surface equivalent to a film surface), a pair of separator lenses 4 which are disposed in parallel with each other in a direction perpendicular to an optical axis of the photographic lens with a space sufficient for assuring focusing accuracy reserved after the condenser lens 3, and a photoelectric converting element array or light receiving element array 5 which is disposed at locations at which images are to be formed by light bundles emerging from the pair of separator lenses 4 respectively.

When the photographic lens 1 is in its focused condition, an image of object I is formed on the predetermined image surface 2. This image of object I is reimaged as a first image $I_{01}$ and a second image $I_{02}$ on the photoelectric converting element array 5, which is disposed as a secondary image surface perpendicular to the optical axis of the photographic lens 1.

When an image of object F is formed before the predetermined image surface 2 by the photographic lens 1, the image of object F is reimaged as a first image $F_{01}$ and a second image $F_{02}$ in the direction perpendicular to the optical axis of the photographic lens 1 but at locations closer to this optical axis. When an image of object B is formed after the predetermined image surface 2 by the photographic lens 1, the image of object B is reimaged as a first image $B_{01}$ and a second image $B_{02}$ in the direction perpendicular to the optical axis of the photographic lens 1 but at locations farther from this optical axis.

In any case, these first and second images are formed in the same direction and it is possible to detect focused condition of the photographic lens 1 including the location of the focused point before or after the predetermined image surface by detecting a distance between the two images. Speaking concretely, the distance between these two images can be determined by detecting light intensity distributions on the first image and the second image, and mathematically processing data of these light intensity distributions.

Focusing of the photographic lens system is performed by moving the photographic lens 1 so that the distance between these two images (the distance between the first image $I_{01}$ and the second image $I_{02}$) is adjusted to a predetermined value. A large number of focus detecting devices of this type have already been proposed as exemplified by those disclosed by Japanese Patent Preliminary Publication Nos. Sho 55-118019, Sho 58-106511 and Sho 60-32012.

Now, principle of the contrast type focus detecting device will be described with reference to FIG. 2 and FIG. 3. This device comprises a photographic lens 1, a predetermined image surface 2 and a condenser lens 3 which are disposed similarly to those shown in FIG. 1, and additionally uses a reimaging lens 6 and a photoelectric converting element array 7 which is disposed in the vicinity of a location conjugate with the predetermined image surface 2.

Figure 2:
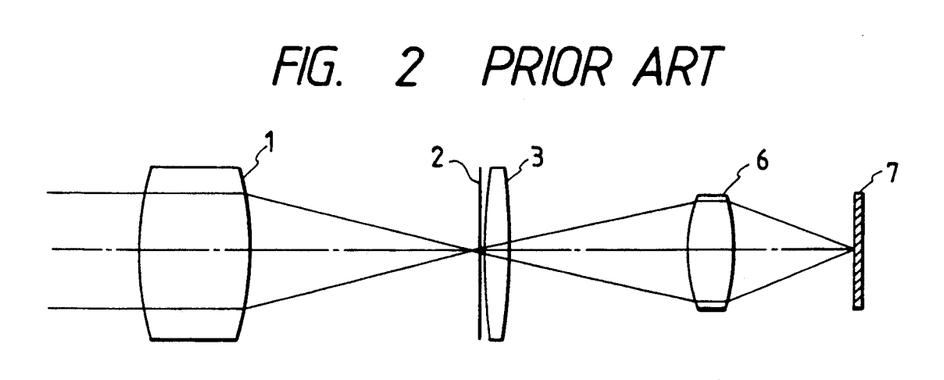
FIG. 2 is a sectional view illustrating the focus detecting optical system of the conventional contrast type.

FIG. 2 illustrates a focused condition wherein a light bundle having passed through the photographic lens 1 is imaged on the predetermined image surface 2. In this condition, the light bundle is converged on the photoelectric converting element array 7 and a sharp image is obtained on a surface of this array. Consequently, bright-dark contrast is high on the photoelectric converting element array 7.

Figure 3:
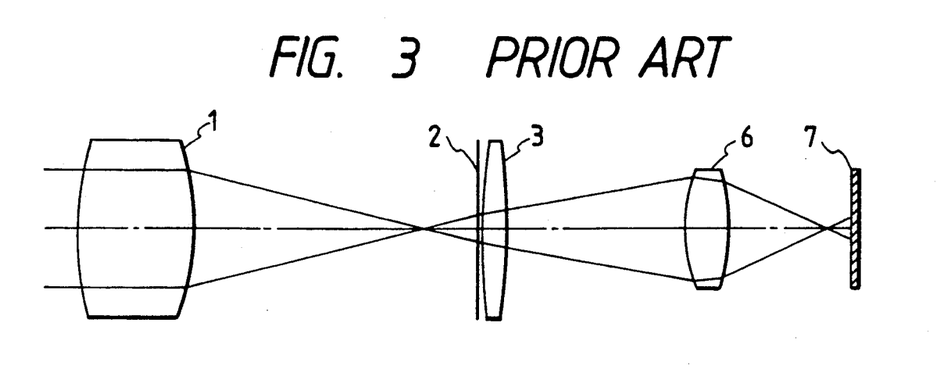
FIG. 3 is a sectional view illustrating a light bundle which is imaged before a predetermined image surface.

FIG. 3 illustrates a condition wherein the light bundle having passed through the photographic lens 1 is imaged before the predetermined image surface 2. In this condition, the light bundle is converged before the photoelectric converting element array 7 and an image is not sharp on the photoelectric converting element array 7. Consequently, bright-dark contrast is low on the photoelectric converting element array 7. In this case, the photographic lens system can be brought to the focused position shown in FIG. 2 or into a properly focused condition by moving this lens system in a direction to enhance contrast.

A focus detecting device, which was disclosed by Japanese Patent Preliminary Publication No. Sho 63-127217, is configured so as to detect bright-dark contrast on two images formed at two locations in the vicinity of the predetermined image surface 2 and detect a focused point on the basis of the contrast at the two locations. Further, it is known that a focused point can be detected by moving the reimaging lens 6.

The phase difference type focus detecting device has a defect that its range finding accuracy is lowered when a photographic lens has a large effective F-number and a portion of a light bundle is vignetted by a separated stop.

This lowering in range finding accuracy will be described with reference to FIG. 4. This drawing shows a phase difference type focus detecting device wherein a light bundle having passed through the photographic lens 1 is imaged on a location before the predetermined image surface 2 and a separator stop 9 is disposed before the reimaging lenses 4.

Figure 4:
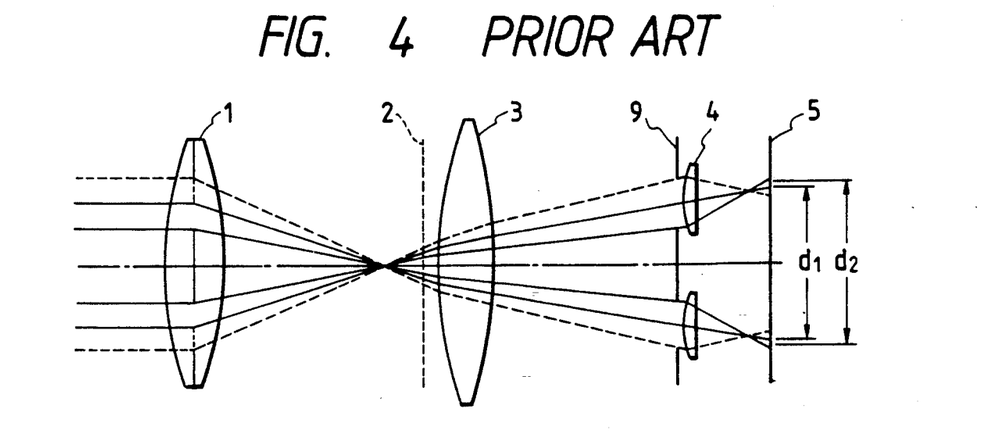
FIG. 4 is a sectional view illustrating a paraxial light bundle which is partially vignetted by the focus detecting optical system of the phase difference type.

When the photographic lens 1 has a small F-number in FIG. 4, two light bundles, each comprising rays indicated by the dashed lines and solid lines, reach the photoelectric converting element array 5 after transmitting through the condenser lens 3, the full ranges of the pair of stop apertures of the separator stop 9 and the separator lenses 4. Let us designate a distance between centers of the two light bundles on the photoelectric converting element array 5 by $d_1$. When the photographic lens 1 has a large F-number, light bundles pass therethrough as indicated by the solid lines. These light bundles transmit through portions of the apertures of the separator stop 9. In this case, the distance between the two light bundles reaching the photoelectric converting element array 5 is $d_2$ which is longer than $d_1$.

Comparing the two cases described above with each other, it will be understood that the distance between the first image and the second image is different depending on F-number of the photographic lens 1 though this lens images the light bundles onto the same locations. Further, even when the photographic lens 1 images the light bundles onto the predetermined image surface 2 unlike the conditions illustrated in FIG. 4, variation of F-number of the photographic lens 1 causes variation in sharpness of the images due to aberrations and produces the phenomenon to change the distance between the images. The contrast type focus detecting device allows the distance between the two images to be changed by a cause other than the imaging location and has a defect that focus detecting accuracy of this device is low.

Figure 5:
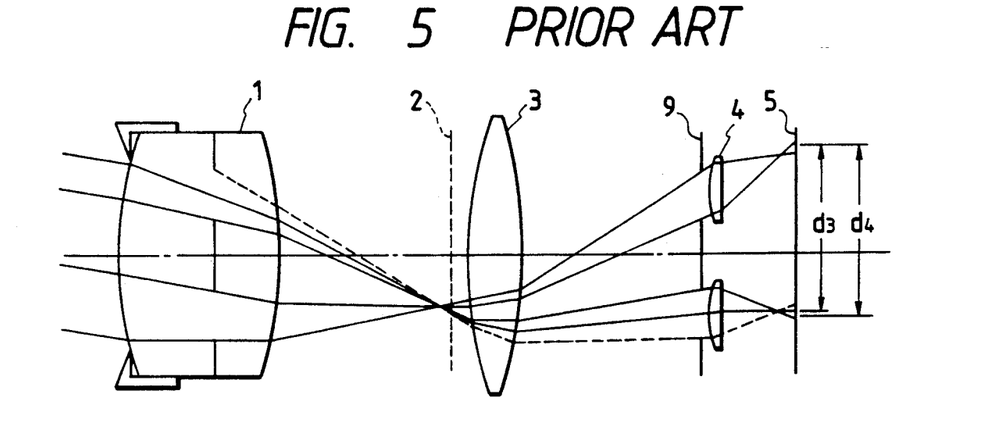
FIG. 5 is a sectional view illustrating an offaxial light bundle which is vignetted, like the light bundle illustrated in FIG. 4, by the focus detecting device of the phase difference type.

Furthermore, in the case of offaxial light bundles, sectional ranges of the light bundles transmitting through the photographic lens 1 are restricted not only by the photographic lens 1 but also by members holding the photographic lens 1 as shown in FIG. 5, whereby sectional ranges of the light bundles allowed to transmit through the two apertures of the separator stop 9 are often asymmetrical with regard to the optical axis and the distance between the two images is changed depending on the sectional ranges of the light bundles allowed to transmit through the separator stop. Speaking of the case illustrated in FIG. 5, the distance between the two images is $d_3$ when the two light bundles pass through the full ranges of the two apertures of the separator stop 9, whereas the distance between the two images is $d_4$ when the light bundle which is to pass through the lower aperture of the separator stop 9 is vignetted by a member for holding the photographic lens 1 and the light bundle is allowed to pass through a partial range of the lower stop aperture. In this case also, the distance between the two images is changed by a cause other than deviation of the imaging location, thereby lowering focus detecting accuracy of the focus detecting device.

The contrast type focus detecting device exhibits, in case of the offaxial light bundles, a defect that it allows difference in marginal light intensity and amounts of aberrations between the two images in addition to the above-described defect that it allows the change of the distance between the two images, whereby the contrast type focus detecting device does not permit correlating the two images and detecting accuracy thereof is lowered. When the photographic lens 1 has a large effective F-number, no light bundle may pass through the separator stop 9, thereby making it impossible to perform range finding. The effective F-number is enlarged when, for example, a zoom lens has a long focal length or the photographic lens system is set at a high magnification.

In the conventional contrast type focus detecting device, a focus detecting optical system which has an entrance numerical aperture smaller than the exit numerical aperture of a photographic lens having a small F-number is disposed taking into consideration dimensions, manufacturing cost and precision of the focus detecting device, and properly balanced detecting accuracies. In this case, the detecting accuracy is lowered under influence due to light bundles which are not incident on the focus detecting optical system.

Figure 6:
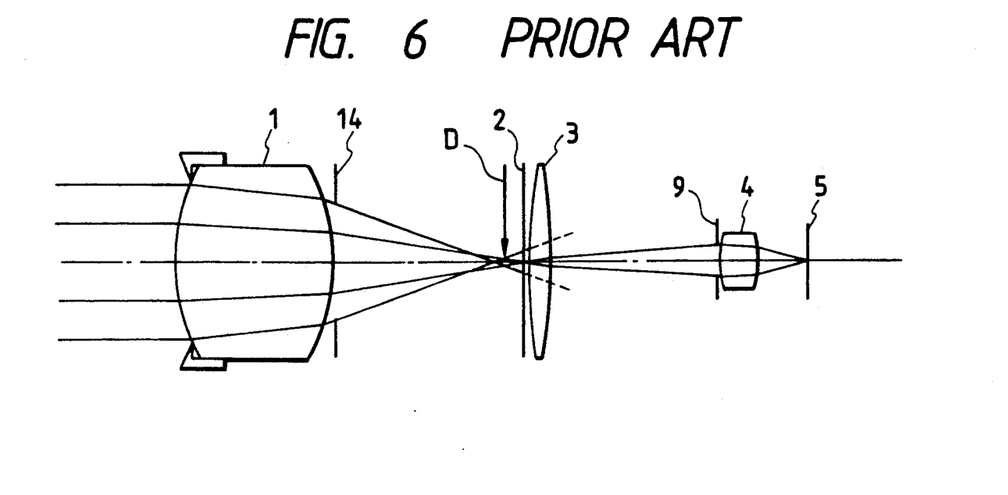
FIG. 6 is a sectional view illustrating a light bundle which is imaged by a focus detecting optical system of the contrast type having an entrance NA smaller than an exit NA of a photographic lens.

This defect will be described with reference to FIG. 6 and FIG. 7. A point indicated by the arrow D is an image point of the photographic lens 1 at which contrast is the highest (optimum image point). Since a light bundle which is within a range of the entrance numerical aperture smaller than the exit numerical aperture of the photographic lens 1 can be incident on the focus detecting optical system and aberrations which are produced by the photographic lens 1 from the light bundles which cannot be incident on the focus detecting optical system are ignored in this focus detecting device, this device has a defect that it detects a point other than the optimum image point as an image point.

Figure 7:
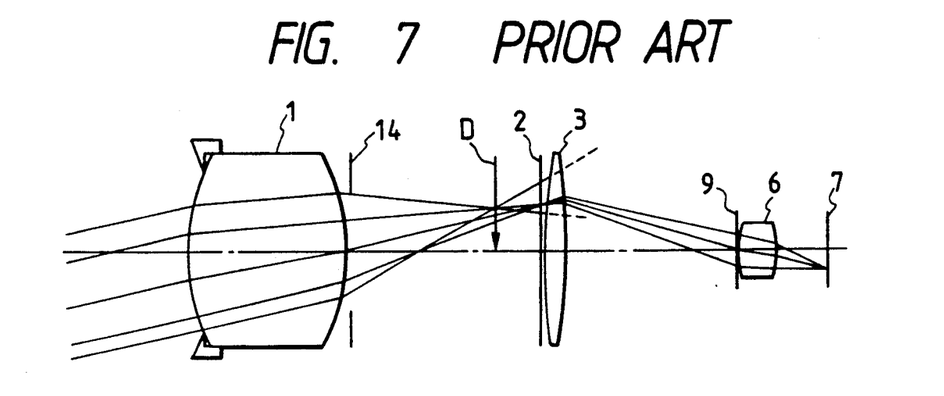
FIG. 7 is a sectional view illustrating an offaxial light bundle which is imaged, like the light bundle illustrated in FIG. 6, by a focus detecting optical system of the contrast type having the entrance NA smaller than an exit NA of a photographic lens.

In case of an offaxial light bundle shown in FIG. 7, the light bundle is made asymmetrical with regard to the optical axis due to vignetting by the members for holding the photographic lens 1 and so on, asymmetrical aberrations such as coma are produced and the adverse influence due to the light bundles, which cannot be incident on the focus detecting optical system, is more remarkable.

It is conceivable, as a measure for correcting these defects, to enlarge the stop aperture disposed before the focus detecting optical system. However, such a measure is undesirable since this measure makes it difficult to correct aberrations by the condenser lens 3 and the exit numerical aperture of the focus detecting optical system is too large for correcting aberrations produced by the reimaging lenses 4, thereby posing strict manufacturing precision on the focus detecting device and enhancing manufacturing cost thereof. Further, enlarging the stop aperture before the focus detecting optical system is undesirable since it results in enlargement of the focus detecting device and a camera body to be used therewith.

Moreover, it is possible to modify the focus detecting device so that it detects the optimum image point after converting light intensity into electric signals by the photoelectric converting element array 5. However, this measure produces defects that each photographic lens requires an enormous amount of correcting data and that data storage members are to be prepared at high cost. In addition, this measure requires a long time for calculations and prolongs the time lag between shutter release and exposure of film.

In the recent years, it is desired to obtain cameras which have wide visual fields for range finding and can automatically be brought into focused conditions, i.e., cameras which can automatically be focused by utilizing optional points within wide visual fields for range finding. Optional focusing locations may be selected by a photographer or according to a judging standard for a control means built in the camera. Focusing functions of the camera may include functions that allow tracing an object to be photographed moving in the direction of the optical axis and other directions and bringing a photographic lens system of the camera into focus on the object.

Out of the cameras which have wide visual fields for range finding and can automatically be brought into focus, cameras, which are equipped with phase difference type focus detecting devices and permit range finding at discontinuous points, were disclosed, for example, by Japanese Patent Preliminary Publication No. Sho 63-131111. However, the camera which permits range finding at the discontinuous points has a defect that it does not permit continuously changing the focusing location. This camera is inconvenient in particular for photographing an object which moves in a direction other than that of the optical axis. Further, a camera which uses a phase difference type focus detecting device and has continuous range finding points was proposed by the applicant as Japanese Patent Application No. Hei 2-98873. However, this is complicated in its composition, is not compact, and requires high cost for manufacturing.

On the other hand, it is desired for the camera which is equipped with the contrast type focus detecting device and has continuous range finding points to utilize photoelectric converting elements having a small size for making the focus detecting device compact as a whole and lowering the cost for the photoelectric converting elements. In order to broaden a visual field permitting range finding and utilize photoelectric converting elements having a small size, it is necessary to lower magnification of the focus detecting optical system.

When a focus detecting optical system is composed so as to have a visual field permitting range finding within an area 32 mm wide by 34 mm long for a 35 mm film (36 mm wide by 24 mm long) by using CCD's having a size 6.4 mm wide by 4.8 mm long as photoelectric converting elements, for example, the focus detecting optical system has a magnification of 0.2×.

Since a movement of an object along the optical axis of the focus detecting optical system causes a movement of an image thereof at a ratio proportional to a square of the magnification, a movement of the predetermined image surface along the optical axis for a distance of 0.25 mm in the direction of the optical axis causes a movement for a distance of 0.01 mm of an image which is formed on the photoelectric converting element array conjugate with the predetermined image surface. The focus detecting optical system cannot detect an amount of defocus of the image which moves for such a short distance. It is therefore impossible to obtain a focus detecting device by composing it as described above.

When it is assumed that a circle of confusion allowed on a film has a diameter of 0.03 mm, an amount of defocus allowed for a photographic lens having an F-number of 2 is 0.06 mm. A focus detecting device must have focus detecting accuracy sufficient for detecting a change of contrast corresponding at least to a shift of a predetermined image surface for a distance of 0.06 mm and bringing a photographic lens system into focus.

Further, focus detecting accuracy is lowered also when the photoelectric converting element array is not conjugate with the predetermined image surface. The photoelectric converting element array is not conjugate with the predetermined image surface in the following cases: (a) when an aberration, for example, distortion of field remains in the focus detecting optical system, contrast on the marginal portions of the photoelectric converting element array is deviated from a peak value on the predetermined image surface even in the condition where the photoelectric converting element array is conjugate with the predetermined image surface, (b) when the photoelectric converting element array is inclined, for example, due to manufacturing error of the focus detecting optical system, some image points are conjugate with the predetermined image surface, but other image points apart from the image points mentioned above are not conjugate with the predetermined image surface. The similar influence is produced not only by the inclination of the photoelectric converting element array but also misalignment of the reimaging lenses or the condenser lens, (c) when the photoelectric converting element array is not conjugate with the predetermined image surface due to manufacturing error of the focus detecting optical system related to thickness of lens, airspace or radius of curvature and (d) when lenses are made of resin materials for facilitating lens shaping or lowering manufacturing cost thereof, the photoelectric converting element array may not be conjugate with the predetermined image surface due to variation of humidity or temperature and swelling or contraction of the members used for holding the lenses.

In addition, when the predetermined image surface of the conventional contrast type focus detecting device is used commonly for a finder system, a predetermined image surface, which is transparent, makes it impossible to bring a photographic optical system into focus by a photographer while observing through a finder optical system. Though it is conceivable to dispose a secondary image surface in an optical path of the finder, this measure inevitably enlarges the finder optical system and is undesirable.

SUMMARY OF THE INVENTION

In view of the problems described above, it is a primary object of the present invention to provide a focus detecting device which has a relatively simple composition, features optical performance scarcely affected by effective F-numbers of photographic lenses and locations of exit pupils, requires no enormous amounts of correcting data for the individual photographic lenses and assures high focus detecting accuracy for objects to be photographed located at paraxial and offaxial locations.

Another object of the present invention is to provide a focus detecting device suited for mounting on a photographing apparatus which can automatically be focused on objects at optional locations within a wide visual field and assuring high focus detecting accuracy.

According to the present invention, these objects are attained by disposing an optical element having a diffusion surface on a predetermined image surface or in an optical path located in the vicinity thereof in a focus detecting device equipped with a photographic optical system and a photoelectric converting means for converting intensity of a light bundle having passed through at least a portion of the photographic optical system, and comprises the predetermined image surface in an optical path formed between the photographic optical system and the photoelectric converting means.

In the preferable formation of the present invention, the focus detecting device is disposed on the emergence side of a photographic lens and is equipped with a splitting mirror which functions to split a light bundle having passed through the photographic lens into two beams to travel along a photographing optical path and along a finder optical path respectively so that a portion of the light beam traveling along the photographing optical path is received by the photoelectric converting means.

In another preferable formation of the present invention, the focus detecting device is disposed on the emergence side of a photographic lens and is equipped with a splitting mirror that functions to split a light bundle having passed through the photographic lens into two beams to travel along a photographing optical path and a finder optical path so that a portion of the light beam traveling along the finder optical path is received by the photoelectric converting means.

The focus detecting device according to the present invention has a relatively simple composition so that the device can be constructed to be compact, manufactured at a low cost and mounted easily on photographing apparatus.

These and other objects as well as the features and the advantages of the present invention will become apparent from the following detailed description of the preferred embodiments when taken in conjunction with the accompanying drawings.

DESCRIPTION OF THE PREFERRED EMBODIMENTS

First, the principle of the present invention will be described below using the reference symbols of the members of the conventional focus detecting devices for the members of the focus detecting device according to the present invention which are substantially the same as those of the conventional focus detecting devices.

Figure 8:
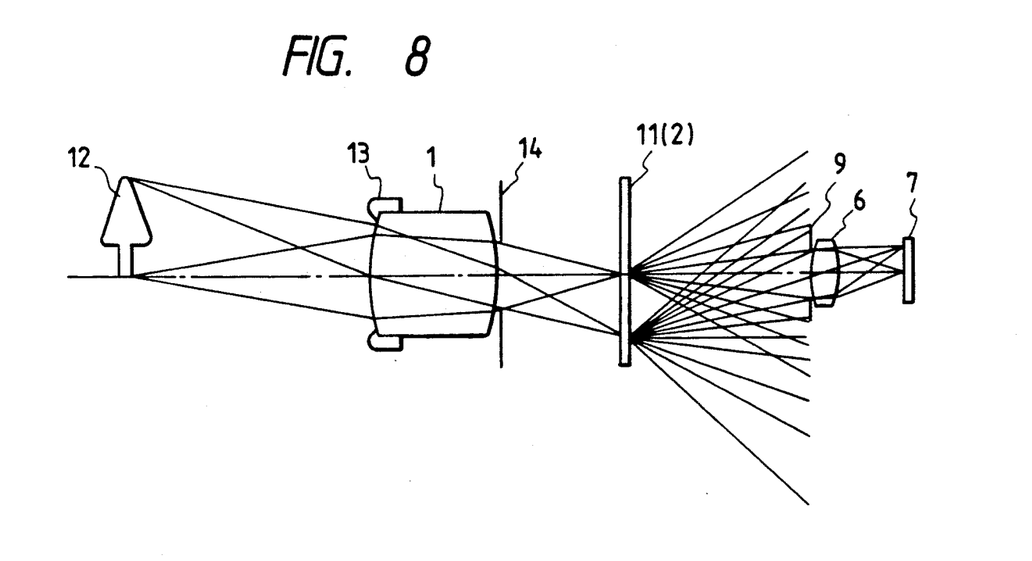
FIG. 8 is a sectional view illustrating a focus detecting optical system which is selected for describing a principle of the present invention using a diffusion surface disposed on a predetermined image surface.

FIG. 8 illustrates the focus detecting device of the so-called contrast type wherein a diffusion surface 11 is disposed in the vicinity of a predetermined image surface. In FIG. 8, a light bundle which is emitted from an object to be photographed 12 and allowed to pass through the photographic lens system 1 is restricted in sectional range thereof by a holding member for the photographic lens system 1 and an aperture stop 14, and then reaches the predetermined image surface 2 on which the diffusion surface (plate) 11 is disposed. When the diffusion surface 11 is a completely diffusing surface, rays emerge from the diffusion surface 11 in all directions and are incident onto the entire range of the aperture stop 9 disposed before the focus detecting optical system. Since only contrast information on the diffusion surface 11 is transmitted to the photoelectric converting element array 7 in this case freely from influences due to the effective F-number, vignetting and location of exit pupil of the photographic lens system 1 and regardless of aberrations produced by the photographic lens, the focus detecting device exhibits stable range finding accuracies for paraxial and offaxial light bundles.

Accordingly, the diffusion surface 11 disposed in the vicinity of the predetermined image surface eliminates the necessity of preparing data in a large amount for correcting influence due to aberrations and makes it possible to detect focused points with high accuracy.

Figure 9:
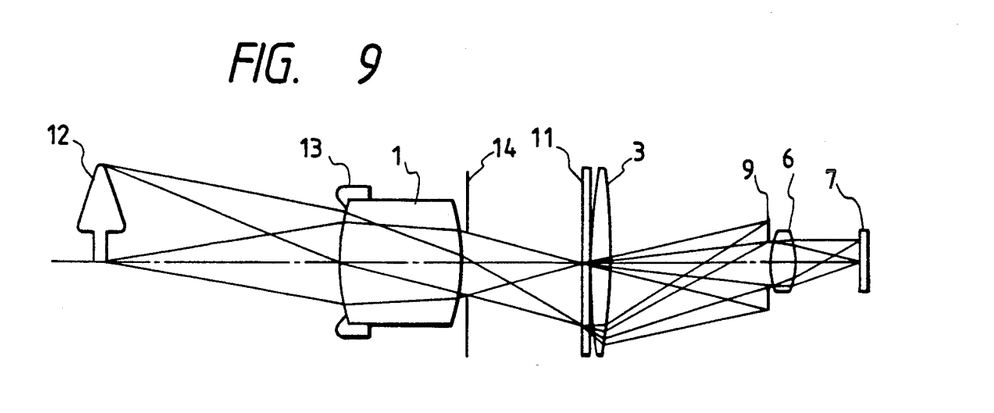
FIG. 9 is a sectional view illustrating a composition, selected on principle, of the focus detecting device according to the present invention.

When the diffusion surface 11 is a completely diffusing surface, however, loss of light intensity is remarkable and illumination is lowered remarkably on the photoelectric converting element array 7. When the condenser lens 3 is disposed after the diffusion surface 11 as shown in FIG. 9 for correcting the defects described above, it is possible to impart directivity to the diffusion surface 11 by narrowing the diffusion range thereof and enhance the illumination on the photoelectric converting element array 7 within a range where the light bundle is free from the influences due to the effective F-number, vignetting and the location of the exit pupil of the photographic lens system 1 adopted in combination with the focus detecting device. Though a lens having curved surfaces on both sides is illustrated as the condenser lens 3 in FIG. 9, the condenser lens 3 may be Fresnel lens or formed integrally with the diffusion plate having the diffusion surface 11.

When the diffusion surface 11 is interchangeable with others having different degrees of diffusion, it is possible to select a diffusion surface which is matched with each of the photographic lenses and enhance illumination on the photoelectric converting element array 7.

Further, the focus detecting device of the conventional contrast type, which detects image contrast on an image surface conjugate with the photoelectric converting element array, allows focus detecting accuracy thereof to be lowered in proportion to amounts of deviation in conjugation when the predetermined image surface and the photoelectric converting element array are not conjugate with each other. In contrast, the focus detecting device according to the present invention having the composition described above is capable of assuring high focus detecting accuracy even when the photoelectric converting element array is not conjugate with the predetermined image surface. Consequently, the focus detecting device according to the present invention can be manufactured more easily, and features enhanced stability against variations of temperature and humidity. Since the focus detecting device according to the present invention permits using small photoelectric converting elements as light receiving elements, the focus detecting device can be configured compact and manufactured at a lower cost. The focus detecting device according to the present invention is therefore optimum for use with photographing apparatus such as cameras which permit range finding at continuous points within visual fields.

Figure 10:
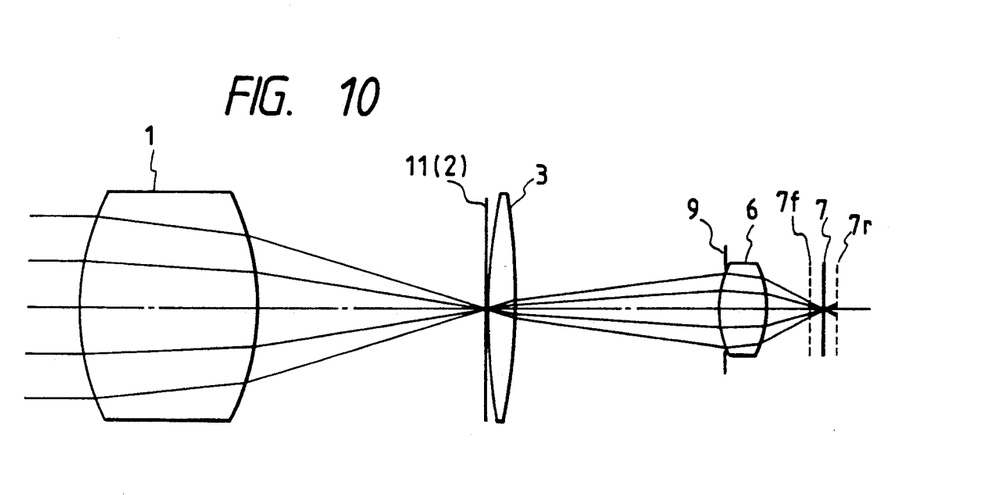
FIG. 10 is a sectional view illustrating a light bundle imaged in a focused condition wherein an image of a photographic lens is formed on the predetermined image surface in the focus detecting device according to the present invention.

FIG. 10 illustrates a focused condition in the focus detecting device according to the present invention shown in FIG. 9 wherein the photographic lens system 1 has a focal point coincident with the predetermined image surface 2. The location of the photoelectric converting element array 7 which is conjugate with the predetermined image surface 2 is indicated by a solid line. The reference symbol 7f represents a photoelectric converting element array that is indicated by the dashed line and deviated toward the predetermined image surface from the location conjugate with the predetermined image surface 2, whereas the reference symbol 7r designates another photoelectric converting element array that is indicated by the dashed line and is deviated away from the predetermined image surface 2 from the location conjugate with the predetermined image surface 2.

On an assumption that light bundles are free from influences due to aberrations, light bundles emerging from the predetermined image surface 2 are imaged on the photoelectric converting element array 7 indicated by the solid line which is conjugate with the predetermined image surface 2 even when the predetermined image surface is not disposed actually or is a diffusion surface. In this case, an image formed on the photoelectric converting element array represented by the reference symbol 7f or 7r is blurred and has contrast which is lower than that on the image formed on the photoelectric converting element array 7. Values of contrast on the image formed on the photoelectric converting element array 7 are visualized by the solid line in FIG. 11. In this drawing, a peak value of contrast is coincident with the location of the photoelectric converting element array 7.

Figure 11:
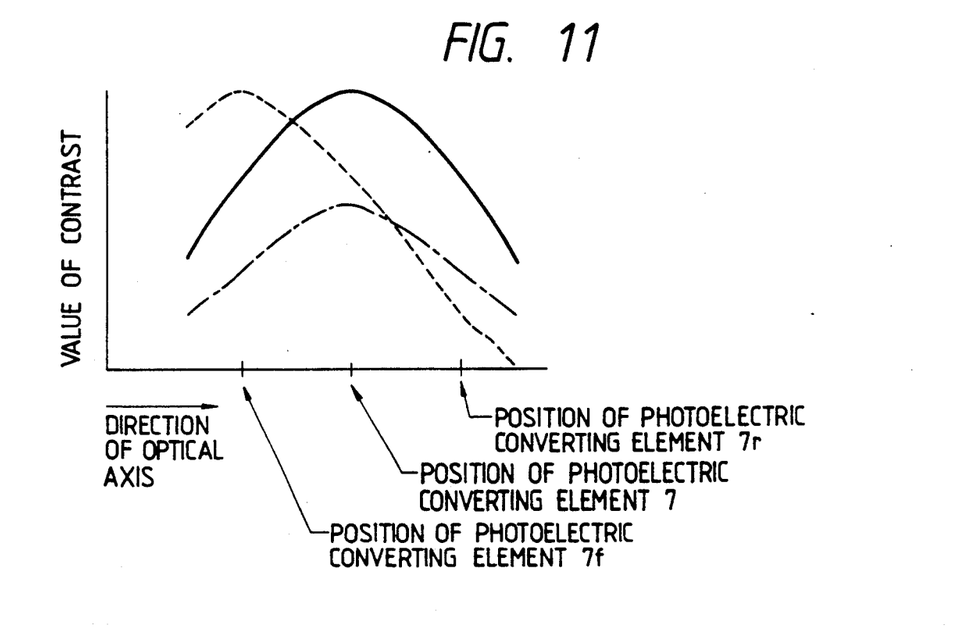
FIG. 11 shows graphs illustrating contrast values on images which are formed on individual photoelectric converting elements in conditions blurred dependently on locations of the photoelectric converting elements.
Figure 12:
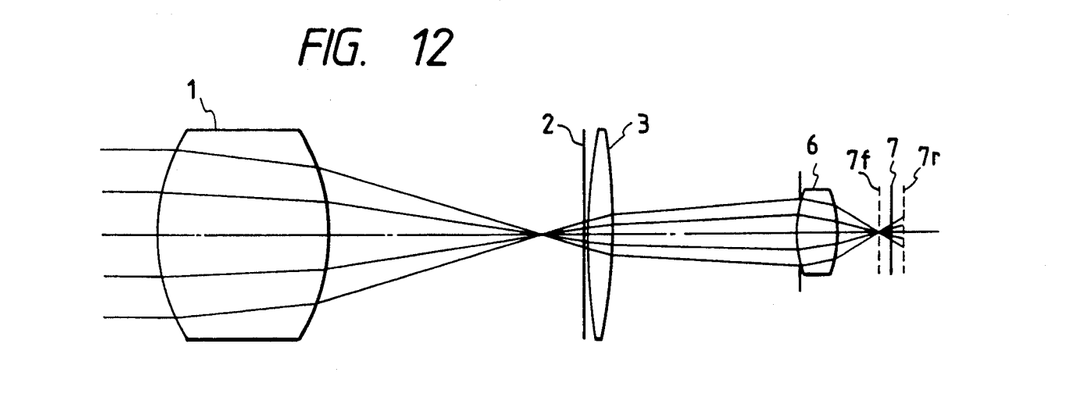
FIG. 12 is a sectional view illustrating a light bundle which is imaged before a predetermined image surface in a focus detecting optical system comprising a transparent predeterminate image surface.

Next, FIG. 12 illustrates a condition wherein the photographic lens system 1 has a focal point before the predetermined image surface 2 and the diffusion surface 11 is not formed on the predetermined image surface 2. In this condition, the focus detecting optical system images a light bundle at the location of the photoelectric converting element array 7f which is disposed before the photoelectric converting element array 7 conjugate with the predetermined image surface 2. Consequently, an image formed on the photoelectric converting element array 7 is blurred and has lowered contrast, and another image formed on the photoelectric converting element array 7r is blurred more remarkably and has further lowered contrast. Values of contrast formed on the photoelectric converting element array 7r are visualized by the dashed line in FIG. 11. In this case, a peak value of contrast is coincident with the location of the photoelectric converting element array 7f.

When image contrast in the photoelectric converting element array 7f shown in FIG. 10 is compared with that on the photoelectric converting element array 7f shown in FIG. 12 referring to the graphs illustrated in FIG. 11, the peak value is higher in the condition illustrated in FIG. 12. That is to say, in the condition where the photoelectric converting element array is deviated forward from the surface conjugate with the predetermined image surface 2 due to manufacturing error or under influence due to variation of temperature or humidity, focusing by detecting a peak value of contrast allows to mistake this condition as a focused condition. In the condition where the photoelectric converting element array 7r is deviated rearward from the surface conjugate with the predetermined image surface 2, the focusing by detecting a peak value of contrast allows to mistake this condition as a focused condition.

Figure 13:
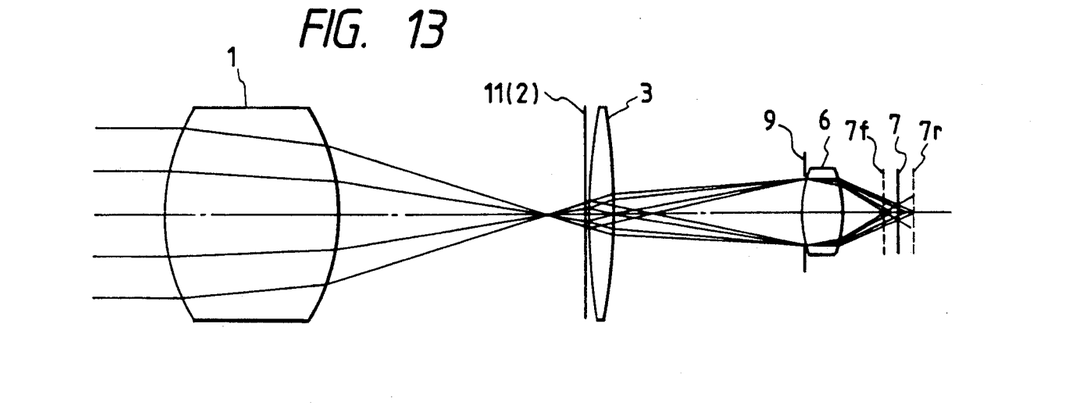
FIG. 13 is a sectional view illustrating a light bundle which is imaged before the predetermined image surface in the focus detecting device according to the present invention.

In contrast, in the focus detecting device according to the present invention which comprises the diffusion surface on the predetermined image surface 2 as shown in FIG. 13, an image which is not sharp is formed on the diffusion surface 11 disposed on the predetermined image surface 2 located after the image point of the photographic lens system 1 when a light bundle is imaged before the predetermined image surface 2 as shown in FIG. 12, but respective points of the image are reimaged on the photoelectric converting element array 7 that is conjugate with the predetermined image surface. Accordingly, blurring of image is restricted to a minimum on the photoelectric converting element array 7 as is apparent from the condition of light bundle illustrated in FIG. 13, whereas images are blurred more remarkably on the photoelectric converting element arrays 7f and 7r which are located before and after the photoelectric converting element array 7. This condition is visualized by the chain line in FIG. 11 which has a peak value coincident with the location of the photoelectric converting element array 7.

So far as the predetermined image surface 2 and the photoelectric converting element array 7 are conjugate with each other, this fact remains unchanged whether the focal point of the photographic lens system 1 is located before or after the predetermined image surface 2. Moreover, comparison of the solid line with the chain line shown in FIG. 11 proves that the solid line represents higher contrast regardless of the locations of the photoelectric converting element array.

Judging from the facts described above, image contrast is varied as indicated by the solid line shown in FIG. 11 by moving the photographic lens system 1 so as to detect peak values of image contrast on the photoelectric converting element array even when it is not located at the position conjugate with the predetermined image surface 2 due to manufacturing error or under the influence due to variation of temperature or humidity, and the peak position of the curve traced in the solid line always corresponds to a focused condition.

Accordingly, it is possible to detect focused conditions accurately even when the photoelectric converting element array is not disposed at the location conjugate with the predetermined image surface 2.

In addition, in a case where the predetermined image surface, which is a diffusion surface, is used commonly in the finder optical system and the focus detecting optical system, it is possible to detect focused conditions by an eye of a photographer who adjusts diopter of his eye to the diffusion surface. In this case, a camera body can be made compact since the finder optical system is separated from the focus detecting system at a location where a light bundle has a small diameter.

Now, the preferred embodiments of the focus detecting device according to the present invention will be described in detail below with reference to FIG. 14 through FIG. 17. In the description that follows, the members which are substantially the same as those described above are represented by the same reference numerals with no particular explanations.

Figure 14:
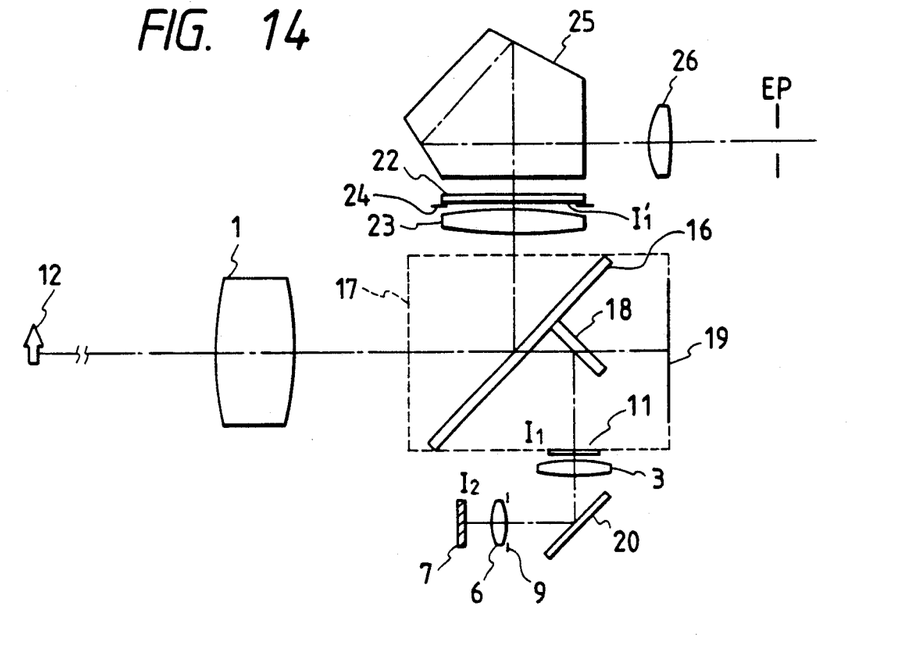
FIG. 14 is a sectional view illustrating an optical system of a photographing apparatus according to a first embodiment of the focus detecting device according to the present invention.

FIG. 14 illustrates an optical system of a photographing apparatus which comprises an optical system of the contrast type preferred as the first embodiment of the present invention. In FIG. 14, the reference numeral 16 represents a leap-up type quick return mirror which consists of a half mirror hinged in a mirror box 17 disposed after the photographic lens system 1, the reference numeral 18 designates a sub mirror which is hinged to the rear surface of the quick return mirror 16, set in a condition where it intersects perpendicularly with the quick return mirror 16 as shown in FIG. 14 when the quick return mirror 16 is kept at a down position (the position illustrated in FIG. 14), and set in another condition where it is parallel with the rear surface of the quick return mirror 16 and kept in close contact therewith when the quick return mirror 16 is kept at an up position. The reference numeral 19 designates an imaging surface disposed on a rear surface of the mirror box 17 at a location after the sub mirror 18.

Further, the first embodiment adopts a diffusion plate which has the diffusion surface 11 on the predetermined image surface equivalent to the imaging surface 19 and is arranged in an optical path for a light bundle reflected by the sub mirror 18, and the condenser lens 3 is arranged at a location after the diffusion plate and in the vicinity of the diffusion surface 11. The reference numeral 20 represents a mirror disposed after the condenser lens 3, and disposed after the mirror 20 are an aperture stop 9, a reimaging lens 6 and photoelectric converting elements 7 as light receiving elements which are arranged at the imaging position of the reimaging lens 6.

Furthermore, the reference numeral 22 represents a focusing screen which is disposed in the optical path for the light bundle reflected by the quick return mirror 16 and on a surface equivalent to the imaging surface 19, the reference numeral 23 designates a condenser lens disposed before the focusing screen 22, the reference numeral 24 denotes a field stop disposed on the front surface of the focusing screen 22 or at location which is the same as that of the focusing screen 22, the reference numeral 25 represents a pentagonal prism having a surface of incidence disposed after the rear surface of the focusing screen 22 and the reference numeral 26 designates an eyepiece lens disposed after a surface of emergence of the pentagonal prism 25.

The photographic lens system 1 and the imaging surface 19 compose the photographic lens system. Further, the quick return mirror 16, the condenser lens 23, the focusing screen 22, the field stop 24, the pentagonal prism 25 and the eyepiece lens 26 compose the finder optical system. Furthermore, the quick return mirror 16, the sub mirror 18, the diffusion surface 11, the condenser lens 3, the mirror 20, the aperture stop 9, the reimaging lens 6 and the light receiving elements 7 compose the focus detecting optical system.

When the quick return mirror 16 is set at the down position, a light bundle which is allowed to transmit through the quick return mirror 16, out of the light bundles imaged by the photographic lens system 1, is led into the focus detecting optical system and a light bundle which is reflected by the quick return mirror 16 is led into the finder optical system. In the finder optical system, the light bundle which has been reflected by the quick return mirror 16 is roughly condensed by the condenser lens 23 to form a primary image $I'_1$ of an object to be photographed 12 on the focusing screen 22, whereafter the image is erected together with an image of the field stop 24 by the pentagonal prism 25 and enlarged by the eyepiece lens 26 for observation at an eye point EP.

If the focus detecting optical system of the first embodiment having the composition described above, a light bundle emitted from the body to be photographed transmits through the photographic lens system 1, and a light bundle which is allowed to transmit through the quick return mirror 16 is reflected by the sub mirror 18 to form a primary image $I_1$ of the object to be photographed 12 on the diffusion surface 11 or at a location before or after the diffusion surface 11. When the primary image $I_1$ is formed at a location deviated from the diffusion surface 11, a blurred image of the object to be photographed 12 is formed on the diffusion surface 11. The light bundle passes through the condenser lens 3, the mirror 20, the aperture stop 9 and the reimaging lens 6 for forming an image $I_2$ on the light receiving elements 7 taking the image formed on the diffusion surface 11 as an object. Light intensities on the image $I_2$ are converted by the photoelectric converting element array 7 into electric signals and processed for detecting image contrast on the diffusion plate 11 or an amount of defocus of the image. When the primary image $I_1$ is located on the diffusion surface 11, the focus detecting device detects a peak value of contrast to indicate that the photographic lens system 1 is in a focused condition whether or not the light receiving elements are disposed at the location conjugate with the predetermined image surface. When the primary image $I_1$ is not located on the diffusion surface 11, the photographic lens system 1 can be brought into the focused condition by moving the photographic lens system 1 until a peak value of contrast is obtained whether or not the light receiving elements are located at the position conjugate with the predetermined image surface 2.

Further, excessive light beams which constitute a cause for producing flare in the focus detecting optical system can be prevented from being incident on this system by disposing the field stop in the vicinity of the diffusion surface 11 in the focus detecting optical system. Furthermore, it is possible to control the so-called moiré stripes which are produced in the photoelectric converting element such as CCD's due to frequency components of the object to be photographed 12 by adequately setting pitches of the hair lines used for forming the diffusion surface 11 without using expensive quartz filters or similar members. In other words, it is possible to reduce the influence due to the object to be photographed 12 on shapes, pitches and locations of the moiré stripes. Moreover, it is possible to eliminate the moiré stripes by setting relieves at random on the diffusion surface 11.

Figure 15:
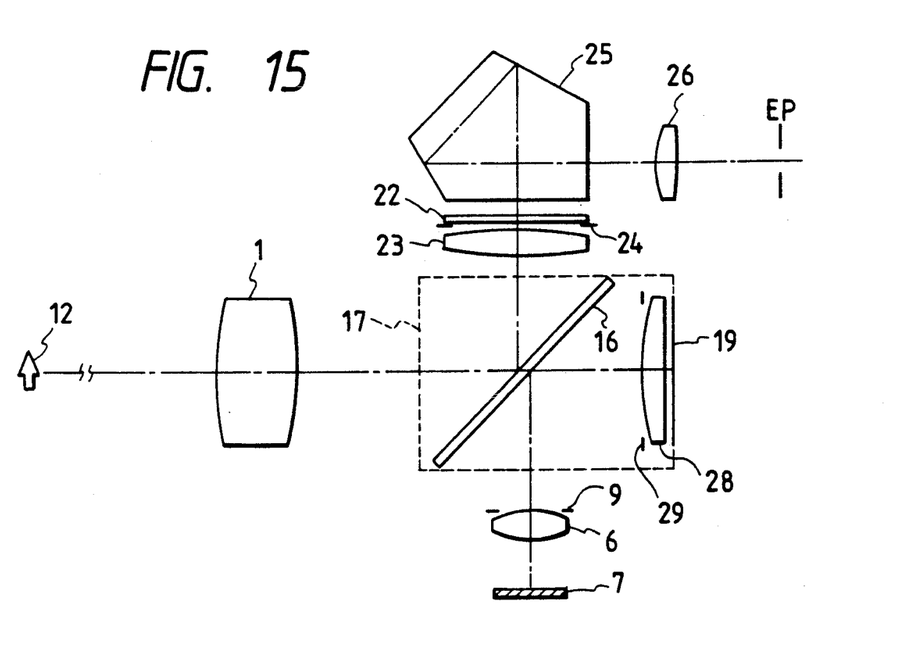
FIG. 15 is a sectional view illustrating an optical system of a photographing apparatus according to a second embodiment of the focus detecting device according to the present invention.

Now, description will be made of the second embodiment of the present invention with reference to FIG. 15 and FIG. 16.

Figure 16:
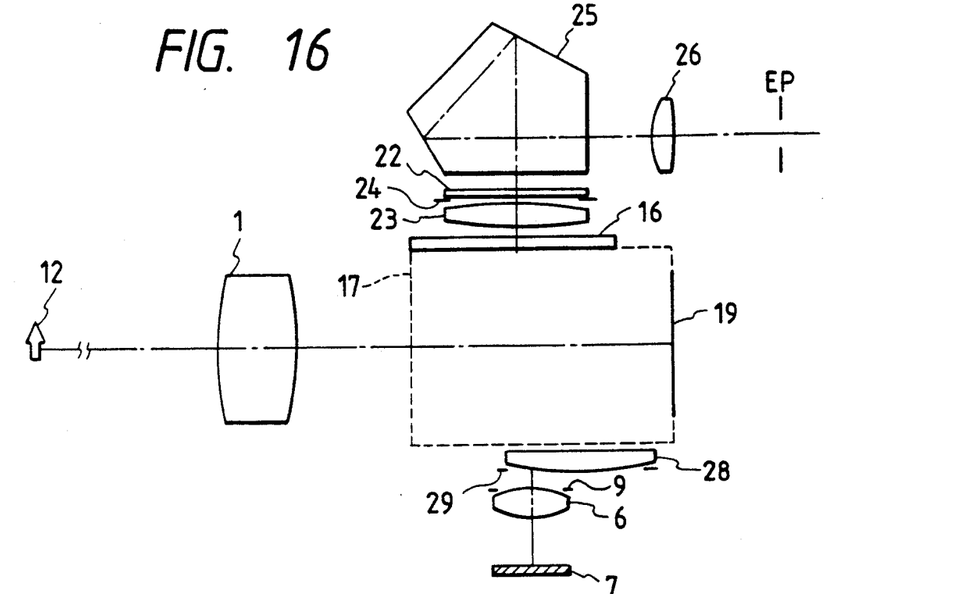
FIG. 16 is a sectional view illustrating disposition of members of the optical system shown in FIG. 15 when it is set in a photographing condition.

Unlike the first embodiment, the second embodiment adopts a focus detecting optical system which does not comprise the sub mirror 18, the diffusion surface 11 and the condenser lens 3, but uses a reflecting member 28, in place of the members mentioned above, which is located before the photographing surface 19 when the quick return mirror 16 is set at the down position (see FIG. 15) and is removed from the optical path of the photographic lens system 1 when the quick return mirror 16 is set at the up position (see FIG. 16). When this reflecting member is set at the position shown in FIG. 15, the surface thereof which is located on the side of the photographic lens system 1 forms a curved lens surface and the surface thereof which is located on the side of the imaging surface forms a reflecting surface having a diffusing characteristic. A field stop 29 is disposed before the reflecting member 28. The second embodiment uses a photographic optical system and a finder optical system which have compositions similar to those selected for the first embodiment, and adopts a contrast type focus detecting optical system which is composed of the quick return mirror 16, the field stop 29, the reflecting member 28, the quick return mirror 16, the aperture stop 9, the reimaging lens 6 and the light receiving elements. In a photographing condition of the second embodiment, the quick return mirror 16, the reflecting member 28 and the field stop 29 are removed out of the optical path of the photographic lens system 1 as illustrated in FIG. 16. The composition selected for the second embodiment makes it possible to obtain a wide visual field for range finding by using a compact mirror box 17.

Figure 17:
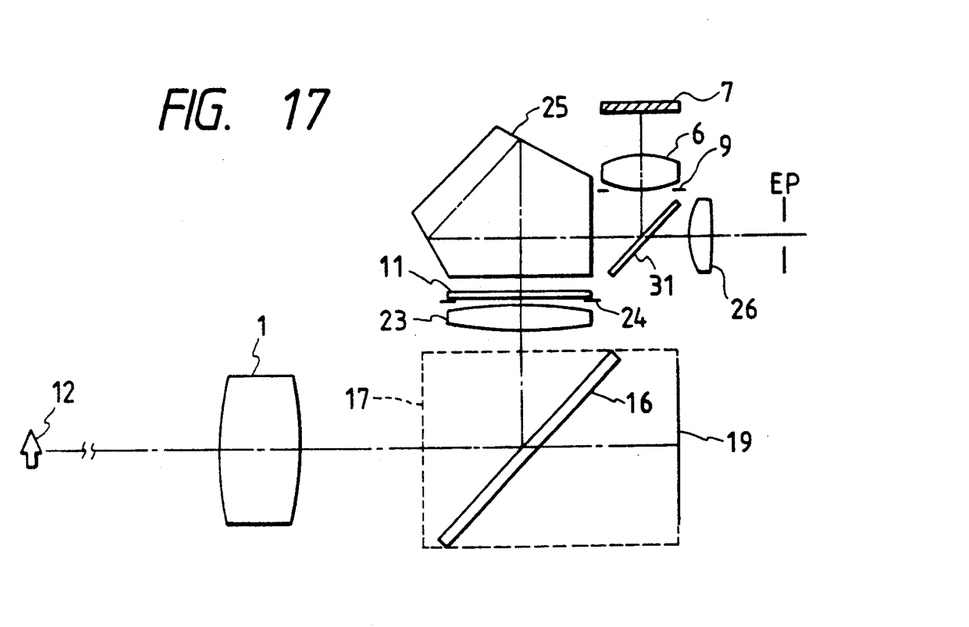
FIG. 17 is a sectional view illustrating an optical system of a photographing apparatus according to a third embodiment of the focus detecting device according to the present invention.

Then, the third embodiment of the present invention will be described below with reference to FIG. 17.

In the third embodiment, a diffusion plate having a diffusion surface, 11 which is equivalent to the imaging surface 9 in the optical path for a light bundle reflected by the leap-up type quick return mirror 16 (the optical path of the finder optical system), is disposed in place of the focusing screen 22 used in the second embodiment described above, a half mirror is disposed between the surface of emergence of the pentagonal prism 25 and the eyepiece lens 26; and the aperture stop 9, the reimaging lens 6 and the light receiving elements 7 are disposed sequentially in the optical path for a light bundle reflected by the half mirror 31.

The photographic optical system adopted for the third embodiment has a composition which is similar to that of the photographic optical system used in the first or the second embodiment described above. A finder optical system is composed of the quick return mirror 16, a condenser lens 23, a field stop 24, the diffusion surface 11, a pentagonal prism 25 and an eyepiece lens 26. The diffusion surface 11 functions as a focusing screen in the finder optical system adopted for the third embodiment. Further, a focus detecting optical system selected for the third embodiment is of the contrast type which is composed of the quick return mirror 16, the condenser lens 23, the field stop 24, the diffusion surface 11, the pentagonal prism 25, a half mirror 31, an aperture stop 9, the reimaging lens 6 and the light receiving elements 7. Though the condenser lens 23 is disposed before the diffusion plate 11 in FIG. 17, the condenser lens 23 may be disposed between the diffusion plate 11 and the pentagonal prism 25. Further, though the reimaging lens 6 and the light receiving elements 7 are disposed above the finder optical system in FIG. 17, the reimaging lens 6 and the light receiving elements 7 may be disposed below the finder optical system or in the direction perpendicular to the paper surface.

The third embodiment has the composition wherein the diffusion surface 11 is used as a predetermined image surface, and comprises the focusing screen for the finder optical system, the condenser lens 23 and the pentagonal prism 25 which are used commonly in the focus detecting optical system and the finder optical system. Accordingly, the third embodiment permits simplifying internal composition of the mirror box 17, and reducing the number of members composing the focus detecting optical system and the finder optical system as well as space occupied by these two optical systems, thereby making it possible to compose compact cameras which have wide visual fields for range finding. Further, since the mirror 31 separates the focus detecting optical system from the finder optical system at a location at which a light bundle has a small diameter, the third embodiment makes it possible to configure camera bodies compact. Moreover, the third embodiment makes it possible to detect focused points by eyes of photographers when diopters of the eyes are adjusted to the diffusion surface 11.

As is understood from the foregoing description, the focus detecting device according to the present invention which comprises a diffusion surface disposed on a predetermined image surface has a relatively simple composition, features optical performance which is scarcely affected by effective F-numbers of adopted photographic lenses or aberrations produced by these lenses, and assures highly accurate focus detection for objects to be photographed which are located at paraxial and offaxial positions. Further, the present invention makes it possible to obtain a compact focus detecting device which has a relatively simple composition, can be manufactured at a low cost, conveniently mounted on cameras, and suited for mounting on photographing apparatus such as cameras automated for focusing on objects to be photographed by using optical points within wide visual fields, and features high detecting accuracy.

What is claimed is:

1. A camera having a focus detecting device, comprising:

a photographic lens;

a splitting mirror disposed on the emergence side of said photographic lens, for splitting a light bundle having passed through said photographic lens into two beams, one beam travelling along a photographic optical path and the other beam travelling along a finder optical path;

reflecting means for directing at least part of the beam of light travelling along said photographic optical path toward a lower side of the camera, thereby deviating the part from said photographic optical path;

photoelectric converting means for receiving the part of the light beam deviated from said photographic optical path by said reflecting means and converting light intensity distribution of the part of said light beam into electric signals; and a diffusion surface disposed at least one position including a position of a predetermined image surface of said photographic lens and at a position adjacent thereto in an optical path located between said photographic lens and said photoelectric converting means.

2. A focus detecting device according to claim 1 wherein said diffusion member is interchangeable with other diffusion members having a different degree of diffusion.

* * * * *